United States Patent
Blume et al.

(10) Patent No.: US 7,043,724 B2
(45) Date of Patent: May 9, 2006

(54) SYSTEM AND SERVICES FOR HANDLING COMPUTING ENVIRONMENTS AS DOCUMENTS

(75) Inventors: William Blume, Santa Clara, CA (US); Sekaran Nanja, San Jose, CA (US); Jagadish Bandhole, San Jose, CA (US)

(73) Assignee: VERITAS Operating Corporation, Mountain View, CA (US)

( * ) Notice: Subject to any disclaimer, the term of this patent is extended or adjusted under 35 U.S.C. 154(b) by 587 days.

(21) Appl. No.: 09/872,346

(22) Filed: Jun. 1, 2001

(65) Prior Publication Data

US 2002/0032695 A1    Mar. 14, 2002

Related U.S. Application Data

(60) Provisional application No. 60/232,602, filed on Sep. 14, 2000.

(51) Int. Cl.
  *G06F 9/445*    (2006.01)
(52) U.S. Cl. ............. 717/168; 717/174; 717/121
(58) Field of Classification Search ......... 717/103; 705/1, 8
  See application file for complete search history.

(56) References Cited

U.S. PATENT DOCUMENTS

| | | | |
|---|---|---|---|
| 4,925,311 A | 5/1990 | Neches et al. | 364/200 |
| 5,394,522 A | 2/1995 | Sanchez-Frank et al. | 395/159 |
| 5,515,524 A | 5/1996 | Lynch et al. | 395/500 |
| 5,555,370 A | 9/1996 | Li et al. | 395/161 |
| 5,668,995 A | 9/1997 | Bhat | 395/674 |
| 5,894,571 A | 4/1999 | O'Connor | 395/652 |
| 6,009,507 A | 12/1999 | Brooks et al. | 712/28 |
| 6,081,846 A | 6/2000 | Hyder et al. | 709/250 |
| 6,182,123 B1 | 1/2001 | Filepp et al. | 709/217 |
| 6,230,200 B1 | 5/2001 | Forecast et al. | 709/226 |
| 6,259,448 B1 | 7/2001 | McNally et al. | 345/348 |
| 6,393,557 B1 | 5/2002 | Guthridge et al. | 713/1 |
| 6,543,047 B1 | 4/2003 | Vrhel, Jr. et al. | 717/121 |
| 6,560,606 B1 | 5/2003 | Young | 707/100 |
| 6,564,112 B1 | 5/2003 | Factor | 700/97 |
| 6,578,141 B1 | 6/2003 | Kelley et al. | 713/1 |

FOREIGN PATENT DOCUMENTS

| | | |
|---|---|---|
| EP | 745929 A1 | 4/1996 |
| EP | 841616 A2 | 5/1998 |

OTHER PUBLICATIONS

Template Software's Application Developer's Training Course, SNAP 8.0 Module 7, 1997.*
Workflow Template, Developing a WFT Workflow System, Whole manual 1998.*
Workflow Template, Using the WFT Development Environment, Whole manual 1998.*
Workflow Template, Using the Web Component, Whole manual 1998.*

\* cited by examiner

*Primary Examiner*—Todd Ingberg
(74) *Attorney, Agent, or Firm*—Campbell Stephenson Ascolese LLP

(57) ABSTRACT

A system for describing computing environments as electronic documents, programs or other types of electronic representation or data is disclosed. The environment description can be created, transferred and ultimately used to create the specified computing environment for use by an end user, or users, in many different applications. The invention provides abstraction software and a user interface to allow a human user to specify a definition for the computing environment. Desired components are selected and included in the environment definition. Environment definitions can be stored and transferred in a manner compatible with typical electronic information. Environment definitions can be installed onto hardware and software resources by installation software. Environments can be installed on specific components from which the environment was originally abstracted, or on other sufficiently similar components. Environments can be remotely manipulated and accessed from computers, terminals, web browsers, handheld devices, or other devices.

43 Claims, 8 Drawing Sheets

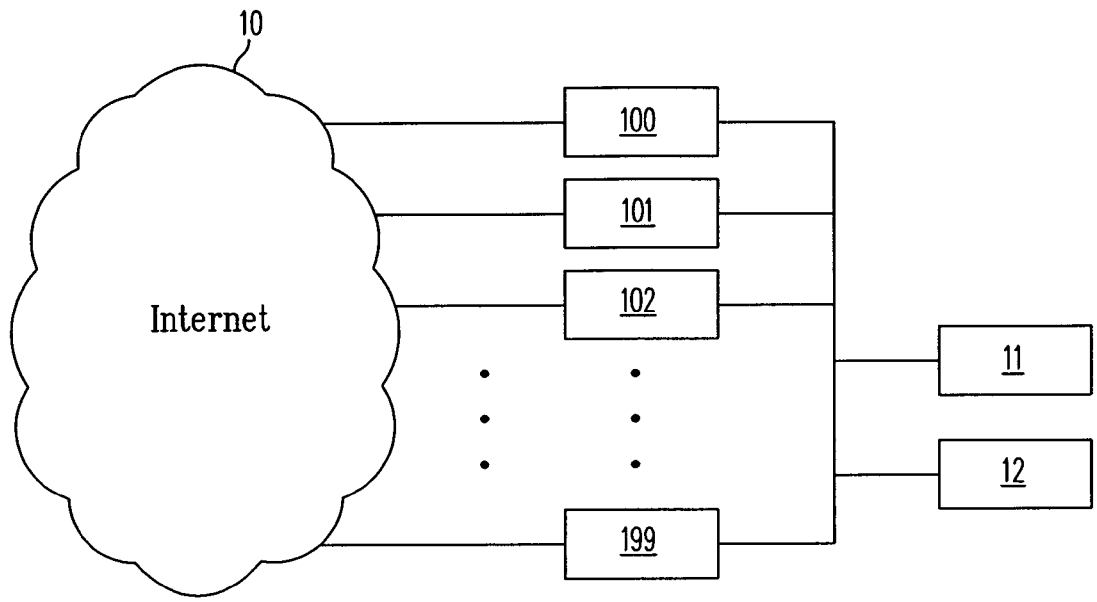

FIG. 1

Typical document representing Oracle/Solaris environment

> Solaris version information
> Oracle version information
> License for Solaris
> License for Oracle
> Storage structure (# of disks/partitions)
> Solaris File System (files containing software code or data)
> Configuration of Oracle (Location of software within file system, configuration files containing parameters needed by Oracle)
> Databases running under Oracle

FIG. 2B

SYSTEM AND SERVICES FOR HANDLING COMPUTING ENVIRONMENTS AS DOCUMENTS

CROSS-REFERENCES TO RELATED APPLICATIONS

This application claims priority from U.S. Provisional Application Ser. No. 60/232,602, filed Sep. 14, 2000, entitled "A System for Handling Computing Environments as Documents or as Programs and a Set of Services Based on the System." This application is also related to U.S. patent application Ser. No. 09/663,252 and Ser. No. 09/662,990 entitled "User Interface for Dynamic Computing Environments Using Allocable Resources" and "System for Configuration of Dynamic Computing Environment Using a Visual Interface," filed Sep. 15, 2000. Both applications and their disclosures are incorporated herein by reference for all purposes.

BACKGROUND OF THE INVENTION

The present invention relates in general to digital processing, and in particular to a system allowing computing environments to be treated as electronic documents or as software programs and to a set of services based on the system.

Although the software components of a computer—the operating system and the set of applications running on top of it—abstractly determine the notion of a "computing environment," in today's practice this notion is closely tied to the underlying hardware as well. Thus, for instance, computer A is considered to be a Windows NT desktop, while computer B is considered to be a Linux server, and computer C a Windows 98 laptop. The bewildering variety of hardware devices reinforces this notion.

Furthermore, the notion of a computing environment can be extended, without loss of generality, to a collection of systems connected by a network. Again, in today's practice, this extended notion carries with it a close association to the underlying hardware, in particular to the individual computer's hardware and the networking hardware used for connecting these computers. For instance, a user connecting a laptop computer to a local area network may need to be aware of the vendor and type of the network card used.

This tight coupling between a computing environment and the underlying hardware, with the added complexity of a networked system, introduces a host of avoidable—yet presently insurmountable—issues to be dealt with by any user intending to buy, provide or use a computing environment.

For instance, an organization may decide to locate a computer in a conference room shared by the marketing and the engineering departments of the organization. The marketing department uses the computer for slide shows and requires the environment of the computer to include Microsoft Windows NT operating system and PowerPoint software. The engineering department uses the computer for product demonstrations and requires the environment to include Linux operating system. With prior art, the computer can provide one environment or the other but cannot readily be changed from one environment to another. The users are usually interested in their specific environments, not their specific computers.

As another example, a system administrator of an organization may be assigned to provide technical support for all computer users within the organization. If the system administrator needs to fix a problem in a user's computing environment, he/she needs to physically visit the user's location. Using prior art, there is no possible way for the administrator to transfer the user's environment to—or replicate the user's environment at—the administrator's location.

Thus, it is desirable to provide a system that decouples computing environments from the hardware as much as possible. Such a system will permit computing environments to be handled as abstractions, which are—at least partially—agnostic about hardware. Services based on such a system will provide increased flexibility for users and reduced maintenance for administrators. Thus the systems and services will be advantageous over prior art in improving the cost-benefit ratio of computing environments.

SUMMARY OF THE INVENTION

A system for describing computing environments as electronic documents, programs or other types of electronic representation or data. The environment description can be easily created, transferred and ultimately used to create the specified environment for use by an end user, or users, in many different applications.

One feature of the invention provides abstraction software and a user interface to allow a human user to specify a definition for the computing environment. Desired components are selected and included in the environment definition. Default components can be provided to help a user design a viable environment. Hardware and software components can also be associated with constraints so that, for example, incompatible components such as software that can not run on different central processing units, under certain operating systems, etc., will not be selected. Abstraction software can also use parameters to associate additional qualities, restrictions or properties with components.

Environment definitions can be stored and transferred in a manner compatible with typical electronic information. Copies of definitions can be made. Definitions can be viewed by application programs, browsers, etc. Definitions can be edited by users with similar types of software, or with other, dedicated software.

Environment definitions can be installed onto hardware and software resources by installation software. Environments can be installed on specific components from which the environment was originally abstracted, or on other sufficiently similar components. Environments can be remotely manipulated and accessed from computers, terminals, web browsers, handheld devices, or other devices. Various services can be provided, or implemented, with the system of the present invention. Examples of services include allowing interactive selection and loading of environments, uploading previously saved environments for storage and future use, replicating environments and distributing the environments as for a corporate-wide deployment in several countries, etc.

Other advantages of the invention are described, including business models such as where a service provider can ensure reliability by having backups of environments that can be easily recalled and reinstated; data center management is facilitated; remote access of environments is made more efficient; and other benefits are achieved.

In one embodiment the invention provides a method for creating an electronic document description of a computing environment installed on computing hardware. The method includes identifying at least one software component of the computing environment; and automatically generating an electronic document containing an identification of each of the at least one software component, the electronic document comprising instructions for automatically reconstructing the computing environment on first computing hardware or on other computing hardware.

In another embodiment the invention provides a method for installing a computing environment on target computing hardware based on an electronic document description of the computing environment. The method includes obtaining an electronic document that contains a description of a computing environment to be installed; reading the electronic document; identifying candidate computing hardware for installation of the computing environment; selecting target computing hardware from the candidate computing hardware for installation of the computing environment; and installing at least one software component on the target computing hardware in accordance with data contained in the electronic document.

BRIEF DESCRIPTION OF THE DRAWINGS

FIG. 1 is a block diagram showing an example of a computing environment.

FIGS. 2A and 2B illustrate a document abstracting the environment of FIG. 1.

DETAILED DESCRIPTION OF THE INVENTION

In the description herein, the term "computing environment" (or simply "environment") includes an operating system and all the applications and documents installed on top of it, or a collection of networked computing environments.

An example of a computing environment is shown in FIG. 1. A web-site system comprises 100 Apache Web servers 100–199 (each on a Windows NT server) connected to Internet 10 and also connected to two Oracle DB servers 11, 12 (each on a Solaris server). This system can be "rolled" into an environment consisting of the Windows NT servers, the Web servers (along with their configuration files), the document tree(s) for the web-site, the Solaris servers, the DB servers, and additional software used for connections, if any.

The present invention provides a system and method for abstracting environments as documents or programs, as well as a system and method for installing environments abstracted as documents or programs on compatible hardware. The system of the present invention can be used to support a number of business models, as the following description will make clear.

The terms "document" and "program" are used interchangeably herein. As will be evident from this disclosure, the present invention handles environments as documents in the sense that they can be stored, copied, edited, etc. But, as will also be evident from this disclosure, environment "documents" may be run or installed in the manner of programs.

Abstracting Environments as Documents or Programs

With the present invention a computing environment may be abstracted out as an electronic document or a computer program.

Figure 2A:
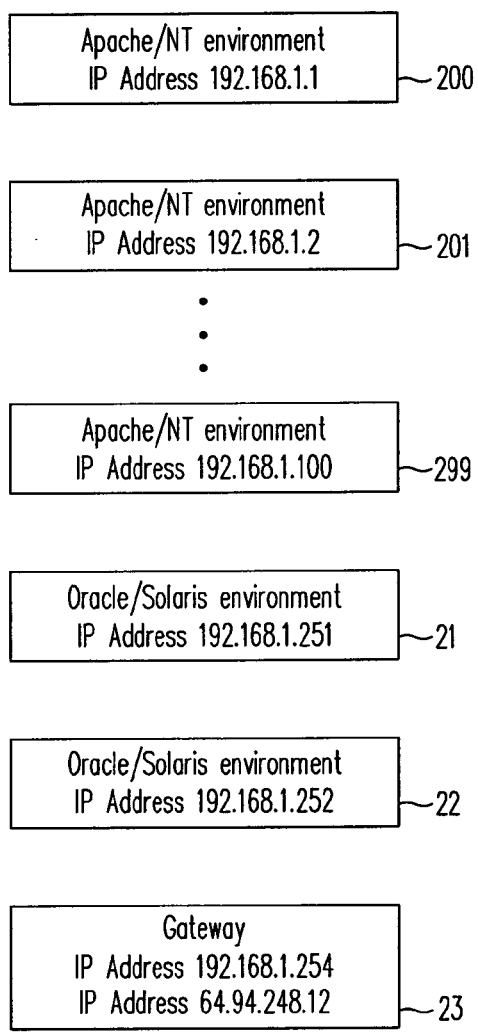

For example, the environment shown in FIG. 1 may be abstracted in an electronic document shown in FIG. 2A. FIG. 2A shows an Apache/NT environment 200–299 corresponding to web servers 100–199 respectively, and an Oracle/Solaris environment 21, 22 corresponding to each Oracle DB server 11, 12. The environment document also includes information regarding the network connections, such as the IP address of each web server, the IP address of each database server, and the IP addresses of the gateway. The collection of IP addresses forms a network with a common prefix (192.168.1). The gateway is not explicitly shown in FIG. 1 but is implicitly represented by the fact that the environment is connected to the Internet. A gateway typically is some hardware or a combination of some hardware and software that interconnects two networks and hence is identified by two network addresses (i.e., IP addresses). In this case, the gateway connects the networked environment in FIG. 1 with the Internet and has one IP address (192.168.1.254) that is part of the networked environment and another IP address that is on the Internet (64.94.248.12). According to the present invention, each web server is an environment by itself, and each database server is an environment by itself. Thus, FIG. 2A refers to these as Apache/NT environments and Oracle/Solaris environments respectively, and these environments in turn can be abstracted as documents. For instance, FIG. 2B shows a document abstracting an Oracle/Solaris environment. This document provides information needed to replicate the Oracle/Solaris environment present in, e.g., server 11. Those skilled in the art will appreciate the details of such a description and will recognize that similar descriptions can be created for other web server environments or other computing environments.

Figure 3:
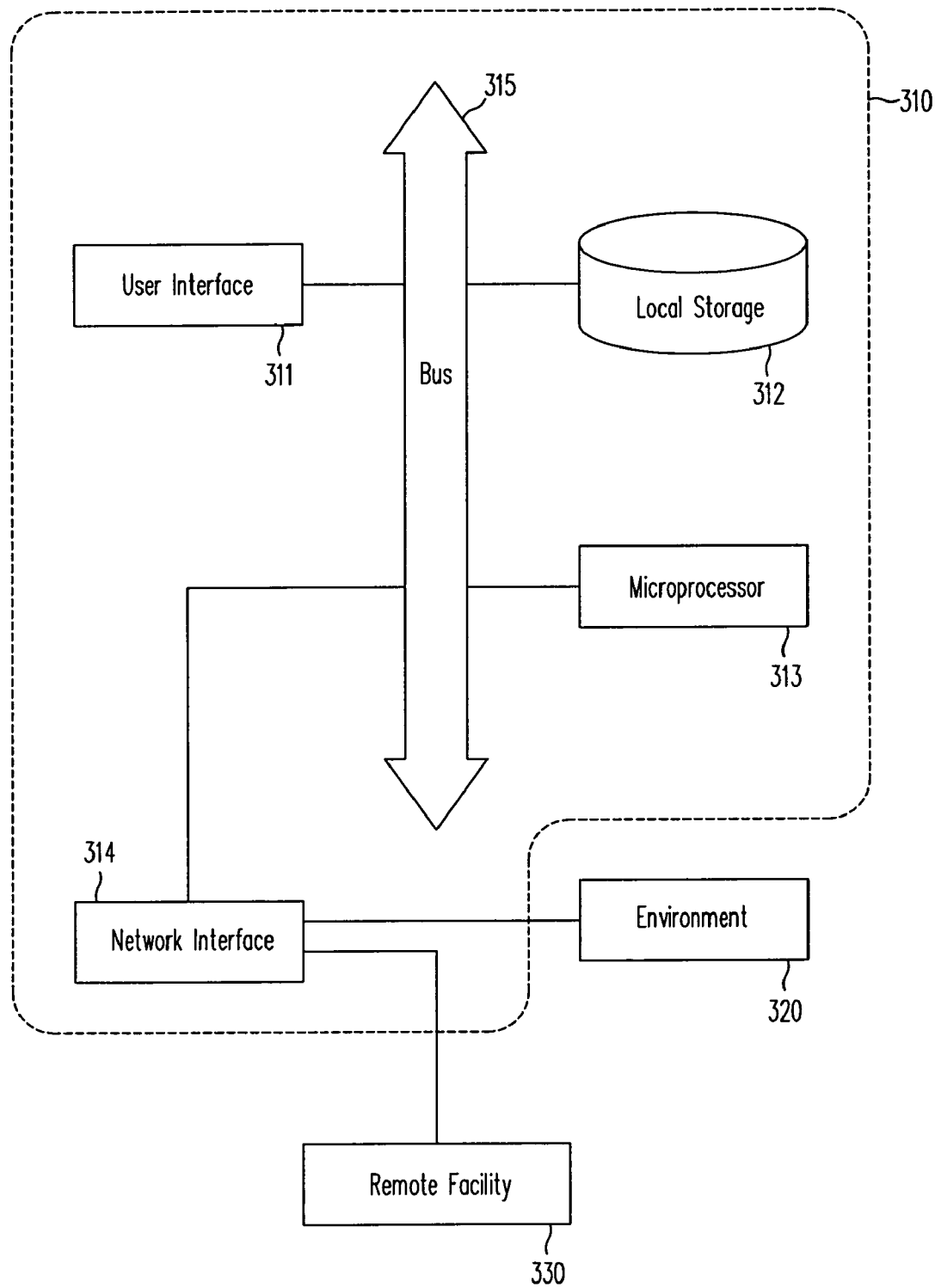
FIG. 3 is a block diagram of a system for abstracting an environment as a document or program according to the present invention.

FIG. 3 shows a system suitable for abstracting environments. User computer 310 comprises user interface 311, local storage 312, and microprocessor 313, all coupled to bus 315. Microprocessor 313 runs abstracting software that creates and edits an environment document or environment program in response to commands received from user interface 311. Preferably, network interface 314 is also present and coupled to bus 315. Network interface 314 enables communication between user computer 310 and an environment present on other hardware 320, and may also enable communication with a remote facility 330, where environment documents may be stored or installed. Network communication may be via local area network, Internet, modem connection, or other network technologies known in the art.

Figure 4:
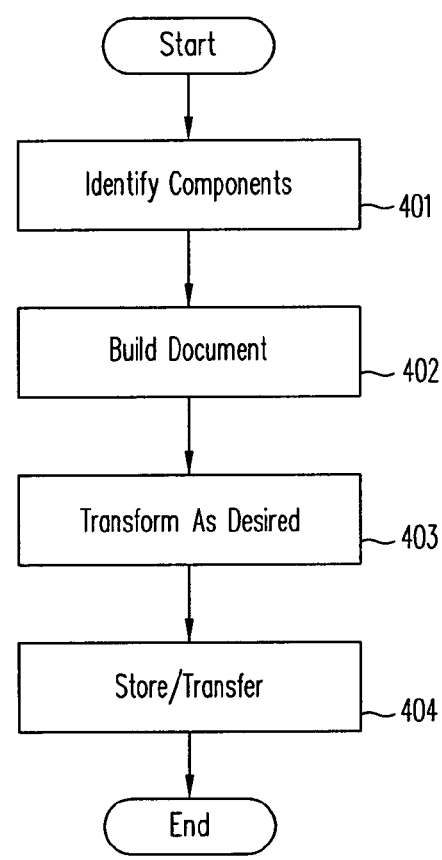
FIG. 4 is a flow chart showing a process for abstracting an environment as a document or program according to the present invention.

FIG. 4 shows an example of steps performed by abstracting software running in microprocessor 313. In step 401, the software identifies the user's desired components. In the simplest embodiment, the abstracting software enables the user to identify the desired components of the environment using a visual interface such as the visual interface described in co-pending U.S. patent application Ser. No. 09/663,252 filed Sep. 15, 2000 entitled USER INTERFACE FOR DYNAMIC COMPUTING ENVIRONMENT USING ALLOCATEABLE RESOURCES (sic) which is hereby incorporated by reference as if set forth in full in this document. For instance, a user may identify an operating system and one or more applications to be run. An environment may also include associated data and/or documents to be used in conjunction with the applications. These components are also identified by the user during step 401. In order to abstract an environment 320, all the required components must be accessible to the system performing the abstraction, i.e., system 310. For example, the environment could be present on user computer 310 itself or as a remote environment 320 that is accessible to user computer 310.

Alternatively, in step 401 a user may also specify an environment without having access to the components. In this situation, a number of environments must have already been abstracted from hardware and stored either on local storage 312 or at remote facility 330. The user selects from these environments a number of components to be included in the user's environment; the user may also accept a default environment defined by a service provider and stored at remote facility 330. As with the abstracting process, the user preferably uses a visual interface to select components.

Once the user has identified the components, in step 402 the abstracting software builds an environment document or environment program incorporating these components. An environment document or environment program may be pure binary code; however, top-level structure may be represented in any language that enables hierarchical data representations. A preferred embodiment uses XML as a data representation language for the top-level structure.

Although one purpose of abstracting computing environments as documents according to the present invention is to abstract away from specifics of the hardware, some abstracted computing environments may still have dependencies on the hardware. For example, in the environment shown in FIG. 1, the Oracle DB server may require at least 100 MB of RAM and at least 800 MB of disk space, and the Apache web server may require that the processors of the Windows NT servers belong to the Intel x86 family. To flexibly address such requirements, the present invention provides that an environment program may also include a set of constraints defining a hardware component of the environment. In a preferred embodiment, step 402 includes a step of generating hardware constraints and including them in the environment program. The constraint set is preferably generated from a simple language of relational expressions and logical operators over numeric and string literals; for example, a constraint set for the system of FIG. 1 with the requirements stated above may be given by the expression:

"Windows NT/Apache={Arch=x86} and Solaris/
Oracle={Memory>=100and Disk>=800}".

Those skilled in the art will appreciate that this technique can be used to include constraints regarding any aspect of the environment, not just hardware; for instance, some versions of software application programs can not run under certain operating systems, or with certain versions of operating systems. Thus, an operating system can have constraints of certain types and versions of application programs, and vice versa.

In a preferred embodiment, the process of abstraction optionally may include abstracting a set of parameters from the environment. Parameters may include specifics of the operating system (genre, version etc.), specifics of the application software (kinds, versions etc.), or the footprints of the application software (installation directories, configuration files etc.).

Parameters may also include sets of possible parameters i.e., types. In such cases, the environment document or environment program created in step 402 may act as a template for different possible environments. For example, in the environment of FIG. 1, the computing environment (C) may be abstracted over the version of the Windows NT systems since no version number was specified. Then the template environment is C(WinNT_version).

Transmission and Replication of Environments

In step 404, the environment program is stored. The program may be stored locally, for instance, in local storage 312 of FIG. 3, or transferred via a network to a remote facility 330 where environment documents or environment programs may also be stored. Storage or transfer may require a transformation of the document in step 403, for instance by using a special representation to avoid corruption, by encrypting the document for secrecy, by archiving to preserve integrity, or by compressing the document for efficiency. Numerous algorithms for performing such transformations of electronic documents are well known in the art. For instance, the "zip" software tool may be used for archiving and compressing. Alternatively, the "tar" software tool may be used for archiving and the "gzip" software tool for compressing.

The document or program may also be replicated to create multiple copies of the same environment. Procedures for replicating (copying) electronic documents are well known in the art.

The document or program may also be edited to modify the environment. There are two different approaches to modifying environment documents. In a preferred embodiment, the user installs an environment on hardware, modifies one or more components of the environment (e.g., adding a new web server in FIG. 1, or adding a new software to an existing web server in FIG. 1), and abstracts a new document representing the modified environment. This process implicitly maintains the integrity of the document, i.e., if the modifications to the environment were successful, then the abstraction process is automatically successful.

In an alternative embodiment, a user edit the document directly. For instance, in the document shown in FIG. 2A, one could add another web server by just replicating an existing Apache/NT environment from the same document. This embodiment may not guarantee the integrity of the modified document for all such changes. For instance, in the document shown in FIG. 2A, if a user modifies an existing document corresponding to an Oracle/Solaris environment by adding a new database, the integrity of the system may not be completely verified until the environment is active, i.e., the document or program is installed. When a user performs a direct edit, the integrity check or consistency check can be abstracted as a constraint or a parameter using the techniques described in the previous section.

Installing Environments

In an embodiment of the present invention, an environment program may be installed either on the hardware from which the environment was abstracted or on other sufficiently similar hardware.

Figure 5:
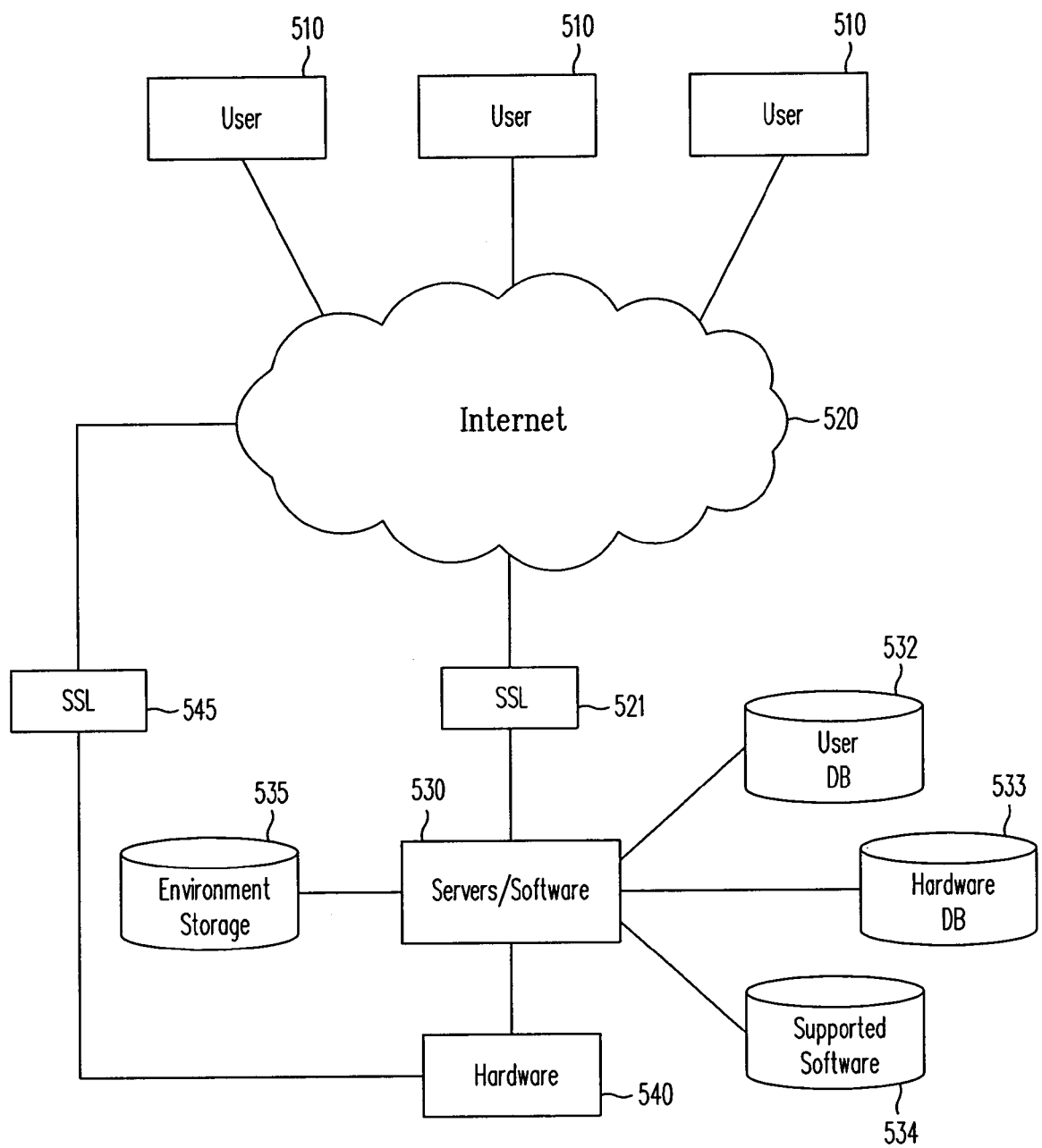
FIG. 5 is a block diagram of a system for installing a computing environment at a remote location according to the present invention.

FIG. 5 is a block diagram illustrating a preferred embodiment of a system for installing environments on a variety of hardware. At least one user terminal 510 communicates via Internet 520 with server 530. Server 530 accesses storage 535 for environment programs received from user terminal 510; storage 535 may also store locally created environments. Server 530 also preferably accesses user database 532, a database of available hardware 533, and a database of supported software 534. Server 530 is also in communication with hardware 540, where user environments can be installed. Hardware 540 may include one or more computers having any type of architecture desired. Hardware 540 may also include networking equipment such as routers, switches, domain name servers, etc.

A user uses a terminal 510 to communicate with server 530 in order to configure environments on hardware 540. In a preferred embodiment, user communication with server 530 is via a secured socket layer (SSL) such as layer 521. Hardware 540 may also have its own connection to Internet 520, independent of server 530, preferably via SSL 545, to enable user communication with installed environments.

Figure 6:
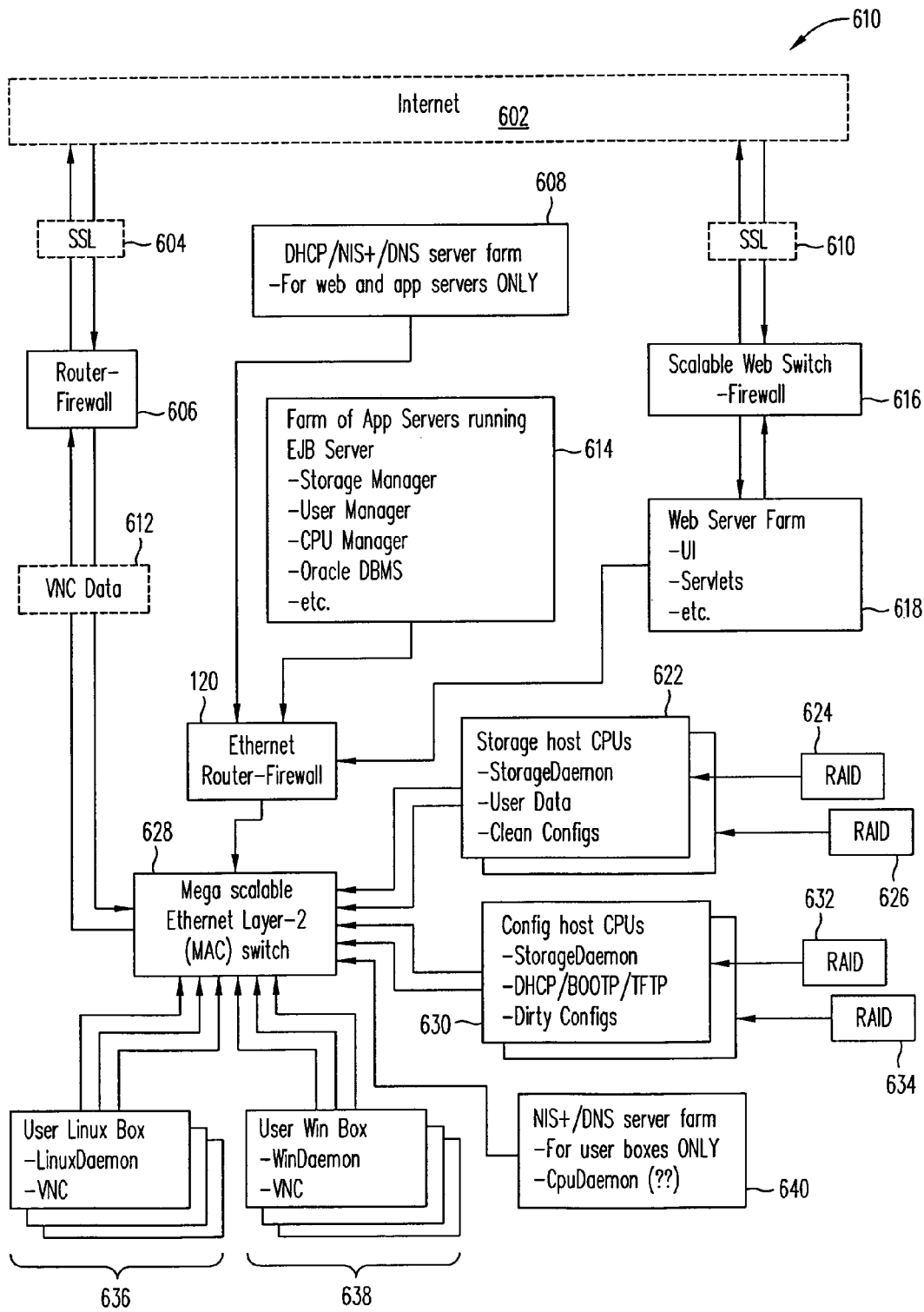
FIG. 6 is a block diagram of another system for installing a computing environment at a remote location according to the present invention.

FIG. 6 illustrates an embodiment of the system of FIG. 5 suitable for providing computing environments to a large number of remote users. User computers (not shown) communicate via Internet 602 with a service provider's system 600. Application server farm 614 provides the functionality of server 530. Server farm 614 includes a plurality of servers, each running Enterprise Java Beans (EJB), which are software components that enable various features of the system and services. For example, Storage Manager handles all activities related to storing and retrieving environments. Oracle DBMS software running on server farm 614 provides access to databases of user information, hardware information, and software information.

Environment storage is provided by RAID arrays 624, 626, 632, and 634. RAID arrays 624 and 626 communicate with server farm 614 via storage host CPUs 622 to provide "clean configurations." Clean configurations are environments supported by the service provider that can be provided by replication to different users. RAID arrays 632 and 634 communicate with server farm 614 via configuration host CPUs 630 to provide "dirty configurations." Dirty configurations are environments specified by users by editing or modifying clean configurations. These environments are specific to users and may not be used by others. Separating clean from dirty configurations provides protection for user's privacy and a measure of security for the service provider.

The hardware for installing environments includes a plurality of user Linux boxes 636 and a plurality of user Win boxes 638. NIS/DNS server farm 640 and Ethernet switch 628 are provided to support networked environments, such as the environment of FIG. 1.

User communications with server farm 614 are via SSL 610, scalable web switch 616, and web server farm 618.

In a preferred embodiment, users may also communicate with installed environments on Linux boxes 636 and/or Win boxes 638. VNC viewers running on Linux boxes 636 and Win boxes 638 enable this communication. SSL 604 provides a secure channel.

The selection and interconnection of these devices, along with other degrees of control of these devices, allows a user to set up many sizes and types of processing architectures and environments.

It is possible to use widely-varying components, or resources, other than those shown in FIGS. 5 and 6. The specific hardware and interconnections of FIGS. 5 and 6 are but one example of an architecture for providing allocable resources to enable configurable computing environments. For instance, many aspects of the present invention can be applied to smaller systems such as a single personal computer. The single computer can be configured with many types of hardware and software and thus is a configurable system in itself.

Figure 7:
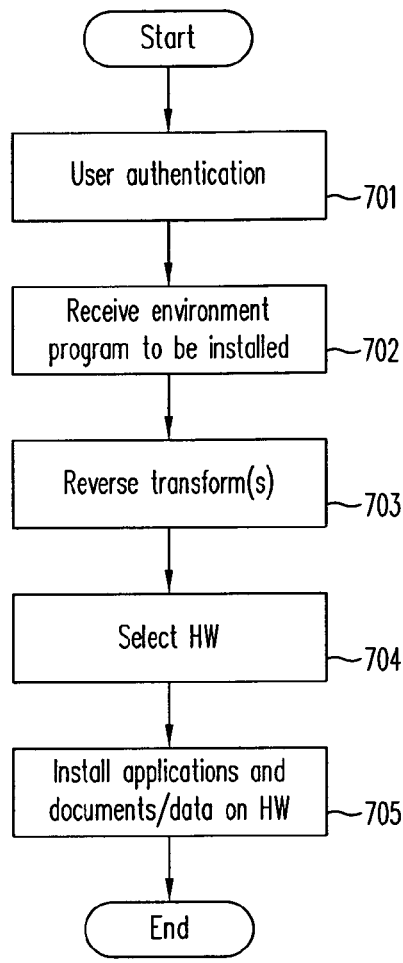
FIG. 7 is a flow chart showing a process for installing an environment according to the present invention.

An example installation process using the embodiment of FIG. 5 is shown in FIG. 7. Although not required by the invention, the installation process preferably begins with user authentication in step 701, wherein user database 532 is queried to confirm that the user is authorized, e.g., by requiring the user to provide a password.

Next, in step 702, an instruction to install an environment program is received at server 530; this step may involve a user sending an environment program for installation to the server via a network or instructing the installer to retrieve and install an environment program from local storage 535. If the environment program was transformed for transfer and/or storage, the installation process performs a reversal of the transformation(s) in step 703.

The installation process then selects hardware on which to install the environment (step 704) and installs the specified applications and documents on that hardware (step 705). As noted above with respect to FIGS. 5 and 6, the invention can be applied to a system such as a single personal computer; in that case, the selected hardware would be the computer itself, which may be the same computer that runs the installation process.

According to the present invention, it is guaranteed either that the environment can be recovered identically to the saved form or that the environment can be recovered in a form that is "behaviorally equivalent" to the saved form. The "behavioral equivalence" of two environments will be predefined for each operating system, for each application within an operating system, and inductively for each combination of applications within an operating system.

For instance, consider Apache web server 1 and Apache web server 2 (out of the 100) in FIG. 1. If web server 1 is saved with its log files as environment document 201, as shown in FIG. 2A, and web server 2 is saved without including its logs files as environment document 202, then documents 201 and 202 are behaviorally equivalent because log files do not affect the functionality of a web server, and everything else about the environments is the same (i.e., Apache, NT etc.). Thus, a document representing the environment of FIG. 1 need not actually include 100 copies of a document corresponding to an Apache web server on a Windows NT computer if all 100 servers are identical. Instead, one such copy would be enough to enable full reconstruction of the environment of FIG. 1.

In a preferred embodiment, an environment program may include hardware constraints as described above. In such a case, in step 704 the installation process selects "compatible hardware," i.e., any hardware "box" that satisfies all of the constraints of the environment program. To determine whether a computing environment can be installed on a given hardware box, the installation process needs only to establish that the given hardware is compatible hardware for the computing environment. For instance, if an environment has a constraint set given by the expression:

"Windows NT/Apache={Arch=x86} and Solaris/
Oracle={Memory>=100 and Disk>=800}", then hardware with "Windows NT/Apache={Arch=586} and Solaris/
Oracle={Memory=200 and Disk=1000}"

would be compatible hardware; of course, hardware with the exact amount of memory and disk space may be available and would also satisfy the constraints.

Figure 8:
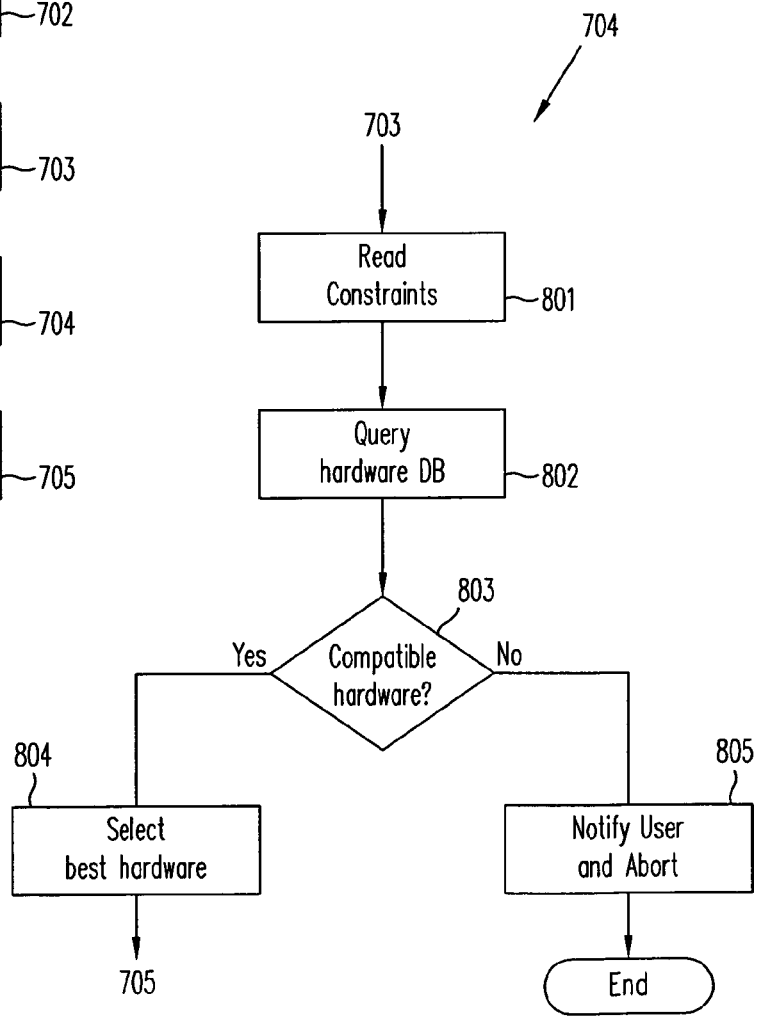
FIG. 8 is a flow chart showing steps in a process for installing an environment with hardware constraints.

A process for selecting compatible hardware in step 704 is shown in FIG. 8. In step 801, constraints are read from the environment document. In step 802, the system consults its database of available hardware to identify one or more hardware boxes with properties that satisfy the constraints. Step 803 determines whether compatible hardware is found. If compatible hardware is found, in step 804 the "best" compatible hardware is selected. If only one option for compatible hardware exists, that option is selected. If multiple options exist, an algorithm is used to select the "best" option according to criteria defined by the service provider. For instance, if the environment requires at least 100 MB of memory and the available hardware includes box A with 200 MB and box B with 500 MB, the algorithm could require that the cheapest box (i.e., box A) be selected. If no compatible hardware is found, the installation fails and the user is so notified.

In other words, to the installation process, symbolic constraint variables such as "Arch" or "Memory" are nothing but names. It is therefore possible to build up arbitrarily complicated sets of constraints without having to incorporate machine-specific checks in the installation process.

Figure 9:
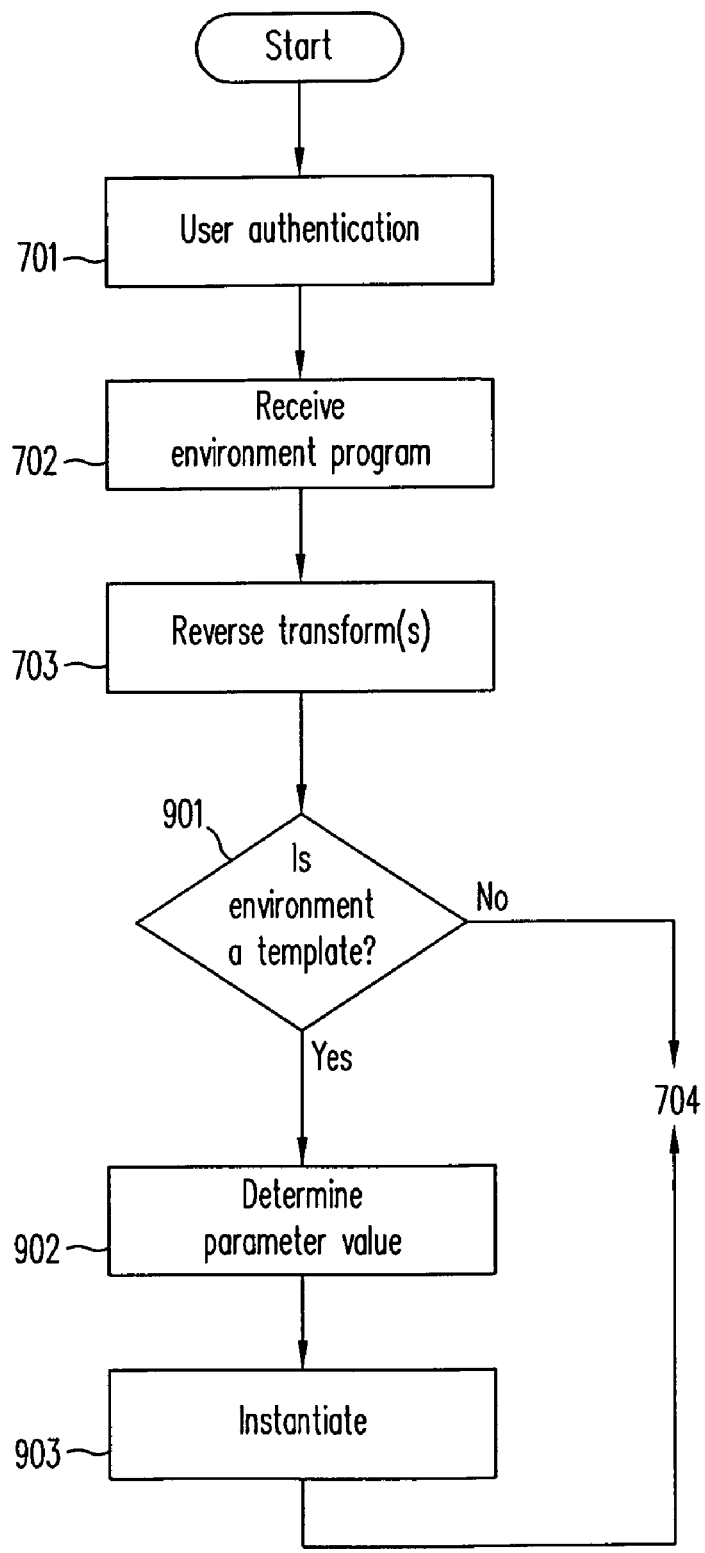
FIG. 9 is a flow chart showing steps in a process for instantiating and installing an environment with parameters.

Additionally, in a preferred embodiment the environment program may be a template for different possible environments, as described above. In this case, the installation process is preceded by an instantiation process, which specifies values for the parameters. An example instantiation process is shown in FIG. 9. The first steps are identical to steps 701–703 shown in FIG. 7. After any transformations are reversed in step 703, the installation process determines in step 901 whether the environment program is a template. If not, the process proceeds to step 704 and the remaining steps.

If the environment program is a template, the installer determines parameter values in step 902 and creates an instance of the program with the appropriate values in step 903. For example, suppose that the template environment is C(WinNT_version). The process of instantiation will determine an available version of Windows NT (e.g., 4.0) by consulting a database of available software/OS and create an instance C_WinNT_4.0. This instance is an environment program, since the only parameter has been defined. If there are multiple parameters, steps 902 and 903 are repeated until all parameters have been defined. The instantiated program is then used in the remaining installation steps, beginning with step 704.

Remote Manipulation of Environments

As described above with respect to FIG. 5, environments installed on hardware 540 may be accessed remotely from a user terminal 510. Further, user terminal 510 may be connected to the Internet through a wired or a wireless connection.

In a further embodiment, environments may be stored remotely and installed after transferring over the network into local hardware. The installation process can be initiated by either side—by push or by pull. For example, in the system of FIG. 5, an environment stored in storage 535 may be transferred over the Internet to a user terminal 510 for installation, either at the user's request or at the instigation of server 530.

Other embodiments include remote access to installed environments and remote installation of environments. In the embodiment of FIGS. 5 and 6, the hardware boxes on which the environment is installed is located on the same network as the server that runs the software for installing environments. But this is not a necessary condition; the server and the hardware boxes could be on different networks, as long as there is a connection (e.g., via the Internet) between the two networks.

Services

The foregoing systems and methods for handling computing environments as documents make possible a set of "externalization" services whereby a user interacts with a service provider via a network to create, replicate, store, and install environments. For purposes of such services, a system like that shown in FIG. 5 is suitable, where server 530 and hardware 540 are owned by the service provider while each of user terminals 510 is owned by a user.

Some services will be apparent to one skilled in the art based on the foregoing disclosure. For instance, one service enables a user to interactively select an environment to be downloaded to a local machine or local network. The user may then save the selected environment for future use or install it and use it. Another service enables a user to upload a previously saved environment onto compatible hardware provided by a service provider or to a storage area provided by the service provider. Still another service enables a user to replicate an environment and to install multiple copies of the environment.

Additional services can be provided based on the systems and methods disclosed above. One skilled in the art will be able to see that these systems and methods can provide, among others, the following services:

One service enables a user to edit an environment to add, remove, or replace application software supported and/or licensed by the service provider. The service provider handles the provisioning of licenses and usage rights associated with the application software.

Figure 10:
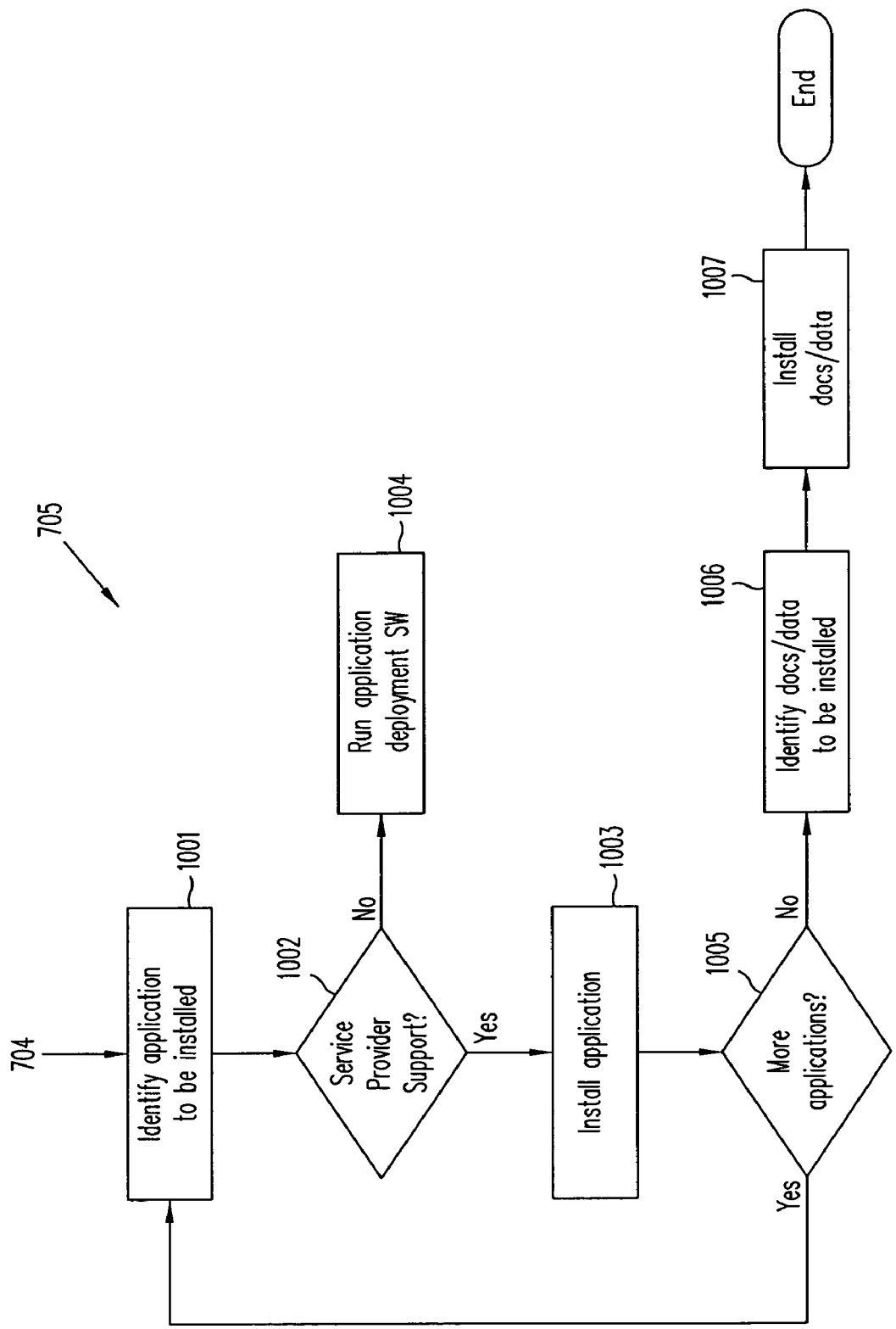
FIG. 10 is a flow chart showing steps in a process for installing an environment that requires third-party software.

Another service enables a user to invoke application-deployment software provided by the service provider to add, remove, or replace application software not supported or licensed by the service provider, herein referred to as third-party software. This feature may be handled by the installer process described above with regard to FIG. 7. As shown in FIG. 10, the installation step 705 optionally provides a process for adding third party software to an environment while still guaranteeing all the properties of the invention. In step 1001, an application to be installed is identified from the environment document. In step 1002, it is determined whether the service provider supports that application. If so, in step 1003, the application is installed. If not, in step 1004, application deployment software is invoked. This software verifies the user's license for the application, gets the application code (which may be in the environment document) and installs the application. In step 1005, if more applications remain to be installed, control returns to step 1001. If not, the installation software proceeds with the final steps of identifying (step 1006) and installing (step 1007) documents and/or data required by the environment.

Another service enables a user to edit a program to add, remove, or replace data associated with the applications that are components of an environment.

Business Models

Using the system and method of the present invention enables a number of business models.

For example, a service provider can provide reliable, fault-tolerant computing environments. In this model, the service provider automatically makes a copy of the user's computing environment. If the user's environment is destroyed, the user is able to retrieve it from the service provider. Conversely, at regular intervals, the user may back up the environment with the service provider. If the user's hardware becomes damaged in some way, the service provider can quickly provide the user's environment to replacement hardware.

As a second example, a service provider can provide high-capacity, scalable computing environments referred to as "data centers" or "network operation centers" (NOCs). These centers are large centralized locations that provide computing infrastructure (hardware, software and networking) to organizations. One embodiment of the present invention enables NOCs to easily accommodate dynamically changing needs of organizations. For instance, an organization may use a first network for its e-commerce operations, a second network for its internal operations, and a third network for its information web site. The e-commerce operation may need more resources during the Christmas shopping season, while the information web site may be doing webcasts of football games, leading to a need for extra resources on game days. So the resource requirements grow and shrink dynamically; for instance, the information web site may need 100 web servers on a "normal" day but 300 on game days. In an NOC using prior art systems, installing a new environment (e.g., converting a hardware box from the information web site configuration to the e-commerce configuration) typically takes days since installation is done manually, and frequent (e.g., every other day) repetition of an installation is not feasible. Using the present invention, a NOC provider may enable users to change environments installed on machines at the touch of a button. Thus the present invention makes environments scalable both in space and time (more machines in less time).

As a further example, a service provider may also provide mobile environments. The service provider provides a collection of hardware that the user can access remotely, for instance through the World Wide Web or via a cell phone or personal digital assistant (PDA). This allows the user to access the environment virtually anywhere. Conversely, the environment may be copied to the user's system (e.g., local desktop, laptop, or PDA and occasionally backed up to the service provider's databases. This provides the user the same benefits as a remote environment without the costs of accessing the environment remotely. Moreover, mobile-environment users who want to use different environments at different times need not "carry" all the environments around; they can simply swap environments in and out on the same hardware (local or remote). For example, a software engineer may develop products using Linux, Java, Apache and emacs, and draft documents using Windows and Microsoft Word. Using the mobile environment service, this engineer can "carry" either one of the environments on his laptop and quickly swap environments on the same laptop by accessing the service provider.

As a further example, a service provider may also provide tailored environments, also called Application Specific Environments (ASE). The service provider provides complete environments for particular problem-domains, such as an application-server environment, an inventory-management environment, and so on. Environments may also be created to cater to certain categories of users, for example, executives, accountants, designers and engineers For example, a standard Software Engineer's environment may include Linux OS; compilers for Java, C, and Perl (or other languages); editors; testing tools; and performance tools. A standard furniture designer's environment may include Windows OS, Microsoft Office (for documentation, project scheduling, etc.), 3-D visualization software for designs, and high-quality printing software. The service provider, instead of the user, handles installation and licensing issues for setting up these environments.

As a further example, a service provider may also provide low maintenance environments, also called outsourced computing. In this model, the service provider owns the hardware and provides remote access to users. This offers users a number of advantages. For example, the service provides easy software installation services and update/patch services on a large scale (by replication). In addition, troubleshooting errors becomes simpler because of the ability to replicate an environment. For instance, intrusive/destructive testing can be performed on a replication of the troubled system while the system itself remains in use, without affecting the functionality or performance of the system. Replication also allows multiple tests to be performed in parallel on different copies of the system, thereby speeding up troubleshooting.

Further, users can compare and evaluate different environments without large overhead costs in procuring, installing and maintaining the hardware and software over short periods of time. Still further, the service provider can provide versioning services for an environment—automatic check-pointing and saving at different states along with roll back.

With the novel systems and methods provided by the present invention, a machine no longer needs to run a particular computing environment, nor does a particular computing environment need to run on a particular machine. A user chooses which computing environment to run. When the user's needs change, the computing environment is easily swappable for another one. Similarly, the user is not limited to running a particular computing environment on a particular machine as computing environments can be readily transferred from one machine to another. For example, a user can move an environment from a PC at home to a laptop, or place the environment in a centralized server that can be accessed from anywhere on the Internet.

These features are brought about by providing an electronic document description of the environment and having a configuration system capable of automatically configuring resources in accordance with the environment's document description. Multiple copies of environments can be made and provided to others. Application vendors can provide entire computing environments to their customers, greatly easing installation issues. Additionally, environments can be modified. One can easily customize an environment for one's own purpose.

Although the present invention has been discussed with respect to specific embodiments, these embodiments are merely illustrative, and not restrictive, of the invention. For example, as used herein, the term "electronic document" should be construed to include information that can be displayed to a human user as well as information that can be read or processed by hardware or software. A "software program" includes instructions or symbols that can be read or interpreted to direct functional actions in software or hardware. The terms "electronic document," "document," "software program" and "program" are each intended to broadly refer to any form of information, including physical and electronic representations.

Thus, the scope of the invention is to be determined solely by the appended claims.

What is claimed is:

1. A method for creating an electronic document description of a computing environment installed on first computing hardware, the method comprises identifying at least one software component of the computing environment; and automatically generating an electronic document containing an identification of each of the at least one software component, the electronic document comprising instructions for automatically reconstructing the computing environment on the first computing hardware or on other computing hardware.

2. The method of claim 1, wherein the first computing hardware comprises a plurality of computers connected by a network.

3. The method of claim 1, wherein a reconstruction of the computing environment from the electronic document installed on other computing hardware is behaviorally equivalent to the computing environment installed on the first computing hardware.

4. The method of claim 1, wherein the at least one software component comprises an operating system and an application.

5. The method of claim 4, further comprising
identifying at least one data file to be used by the application; and
including in the electronic document a representation of each of the at least one data file.

6. The method of claim 1 wherein the step of identifying at least one software component comprises identifying all software components installed on the first computing hardware.

7. The method of claim 6, wherein the first computing hardware comprises a plurality of computers connected by a network.

8. The method of claim 1, further comprising
identifying a requirement for computing hardware on which the computing environment may be installed; and
including in the electronic document a constraint corresponding to the requirement.

9. The method of claim 1, wherein the step of automatically generating the electronic document comprises:
identifying at least one parameter of the computing environment for abstraction; and
abstracting the at least one parameter.

10. The method of claim 1, further comprising the step of storing the electronic document.

11. The method of claim 10, further comprising the step of compressing the electronic document.

12. The method of claim 10, further comprising the step of encrypting the electronic document.

13. The method of claim 10, further comprising the step of transmitting the electronic document to a remote location.

14. The method of claim 10, further comprising the step of replicating the stored electronic document.

15. A method for installing a computing environment on target computing hardware based on an electronic document description of the computing environment, the method comprising
obtaining an electronic document that contains a description of a computing environment to be installed;
reading the electronic document;
identifying candidate computing hardware for installation of the computing environment;
selecting the target computing hardware from the candidate computing hardware for installation of the computing environment; and
installing at least one software component on the target computing hardware in accordance with data contained in the electronic document.

16. The method of claim 15, wherein the electronic document was previously abstracted from a computing environment installed on original computing hardware and wherein the computing environment installed on the target computing hardware is behaviorally equivalent to the computing environment installed on the original computing hardware.

17. The method of claim 15, wherein the step of obtaining an electronic document comprises the step of receiving an electronic document from a remote location.

18. The method of claim 15, wherein the step of obtaining an electronic document further includes
receiving an instruction from a remote user location to retrieve a user-specified electronic document from a storage location; and
retrieving the user-specified electronic document from the storage location.

19. The method of claim 15, further comprising the step of installing at least one data file on the target computing hardware in accordance with data contained in the electronic document.

20. The method of claim 15, wherein the step of selecting the target computing hardware comprises
reading a set of hardware constraints from the electronic document;
identifying as acceptable computing hardware each of the candidate computing hardware that satisfies the set of hardware constraints; and
selecting the target computing hardware from the acceptable computing hardware as the target computing hardware.

21. The method of claim 15, further comprising
determining from the electronic document whether the computing environment includes a parameter; and
if the computing environment includes a parameter then performing the following:
selecting a value for the parameter; and
providing an instantiated electronic document incorporating the value selected for the parameter.

22. The method of claim 15, wherein the step of installing at least one software component includes
determining whether an owner of the target computing hardware has rights to use the at least one software component;
installing the at least one software component when the owner of the target computing hardware has rights to use the at least one software component; and
when the owner of the target computing hardware does not have rights to use the at least one software component, performing the following:
determining whether a provider of the electronic document has rights to use the at least one software component;
retrieving executable code for the at least one software component from a source when the provider of the electronic document has rights to use the at least one software component; and
installing the at least one software component on the target computer hardware when the provider of the electronic document has rights to use the at least one software component.

23. A system for creating an electronic document description of a computing environment comprising:
first computing hardware whereon the computing environment is installed; and
a processor in communication with the first computing hardware, wherein the processor is configured to identify a software component installed on the first computing hardware and to generate an electronic document that includes identification of the software component.

24. The system of claim 23 wherein the processor is a component of the first computing hardware.

25. The system of claim 23 wherein the processor communicates with the first computing hardware via a network.

26. A system for installing a computing environment on target computing hardware in accordance with an electronic document description, the system comprising:
   a storage medium for storing one or more electronic documents, each of said one or more electronic documents containing a description of a computing environment;
   a server connected to the storage medium for reading electronic documents and issuing instructions to install computing environments in accordance with the electronic documents;
   candidate computing hardware whereon a computing environment may be installed, the target computing hardware being selected from the candidate computing hardware; and
   a communication path between the server and the candidate computing hardware.

27. The system of claim 26 wherein the communication path comprises a network.

28. The system of claim 27 wherein the candidate computing hardware comprises a plurality of computer systems.

29. The system of claim 28 wherein the server is configured to select as the target computing hardware a subset of the plurality of computer systems.

30. The system of claim 29, wherein the server communicates with a remote user terminal via the Internet.

31. The system of claim 30, wherein the target computing hardware communicates with the remote user terminal via the Internet.

32. The system of claim 30 wherein the server is configured to receive from the remote user terminal an instruction to retrieve a user-selected electronic document from the storage medium and to install a computing environment on target computing hardware in accordance with the user-selected electronic document.

33. The system of claim 30 wherein the server is configured to retrieve an electronic document from the storage medium and to provide the retrieved electronic document to the remote user terminal.

34. The system of claim 30 wherein the server is configured to receive an electronic document description of a computing environment from the remote user terminal and to store the received electronic document in the storage medium.

35. A computer-readable medium including instructions for creating a computing environment, the computer-readable medium including
   one or more instructions for identifying at least one software component of the computing environment;
   one or more instructions for associating a constraint on the use of the software component.

36. The computer-readable medium of claim 35, wherein the at least one software component includes an operating system.

37. The computer-readable medium of claim 35, wherein the constraint includes an indication of a hardware architecture under which the software component can execute.

38. A computer data signal embodied in a carrier wave comprising
   one or more instructions for identifying at least one software component of the computing environment;
   one or more instructions for associating a constraint on the use of the software component.

39. The computer data signal of claim 38, wherein the at least one software component includes an operating system.

40. The computer data signal of claim 38, wherein the constraint includes an indication of a hardware architecture under which the software component can execute.

41. A method comprising:
   accessing an electronic document, wherein
      the electronic document comprises:
         information identifying one or more components of a computing environment, and
         constraint information identifying a constraint associated with one of the one or more components;
   selecting hardware that satisfies the constraint identified in the electronic document; and
   installing the one or more components identified in the electronic document on the selected hardware.

42. The method of claim 41, wherein the one of more components comprise an operating system, an application, and a document.

43. The method of claim 42, further comprising:
   detecting that the electronic document is a template document; and
   instantiating an environment program from the electronic document, wherein
      the instantiating the environment program comprises specifying a values for a parameter identified in the electronic document, wherein the value identifies a version of a first one of the one or more components, and
      the installing the one or more components comprises installing the version of the first one of the one or more components.

* * * * *